United States Patent Office 3,212,902
Patented Oct. 19, 1965

3,212,902
RECOVERY OF EDIBLE PRODUCTS FROM SPENT GRAINS AND YEASTS
Vincent S. Bavisotto, Whitefish Bay, Wis., assignor to Chas. Pfizer & Co. Inc., New York, N.Y., a corporation of Delaware
No Drawing. Filed Dec. 26, 1962, Ser. No. 247,315
7 Claims. (Cl. 99—9)

This invention relates to spent brewers' grain, spent brewers' yeast, and fresh yeast. More particularly, it relates to a novel method of recovering edible by-products from said spent brewers' grain and yeast.

In the manufacture of beer and ale by the fermentation of cereals, such as barley, the cereal is subjected to a brewing process followed by a fermentation process. In the manufacture of beer, for example, malted barley is frequently used. Malted barley is made by the germination of the barley, removal of the germ after drying, and crushing of the remaining grain. The malted barley is mixed with some other grain, such as crushed corn or rice, and the mixture treated with hot water at 70° to 74° C. so that the amylase from the malted barley converts the starch of the grains into dextrins and fermentable sugars. The filtrate from this mixture is called the "wort," and the residue which contains, in the undissolved state, most of the protein, is referred to hereinafter as spent brewers' grain. The process as carried out to this point is often referred to as brewing.

The wort is boiled with hops; the heat stops the action of the amylase and sterilizes the wort, while the extraction of the hops provides constituents which are flavor-producing and preservative. The wort is thereafter cooled and subjected to fermentation by the addition of brewers' yeast, *Saccharomyces cerevisiae*, or the like yeast. A "bottom yeast" is usually used in beer manufacture and a "top yeast" for ale. A top yeast is one in which the cells gather in clumps and are carried to the top of the fermentating liquid by gas caught in the clumps, while the cells of a bottom yeast stay fairly well separated and settle toward the bottom. The yeast utilizes the normally fermentable sugars which are part of the wort medium. The primary fermentation of the beer wort occurs at about 7° to 14° C. and ordinarily takes from seven to nine days. This is followed by the secondary or "lager" fermentation at 0° to 4° C. for two to six weeks or longer. The beer is thereafter clarified or filtered. The residue obtained is hereinafter referred to as spent brewers' yeast. The beer is then carbonated and barrelled, bottled or canned.

The spent brewers' grain as hereinbefore defined is a product containing substantially all the original constituents of the malt and adjuncts except the starch, small portions of water soluble materials, and small portions of the protein fraction, about 25 to 30% protein based on solids content. The spent brewers' grain is generally dried and usually sold as animal feed, especially as feed for ruminants since the fiber content renders it of less value to other animals. It is well known in the art that the high fiber content of spent brewers' grain limits its value as a feed, restricting its use as a feed to animals that can tolerate a high fiber content in their feed. Since most of the protein matter is found in the spent brewers' grain, it would be highly desirable to separate the protein matter from the remaining spent grain, which is high in fiber content, thus enabling the high protein content product obtained from spent brewers' grain to be used for consumption by man and animals other than ruminants.

The spent brewers' yeast as hereinbefore defined is a product containing substantially all of the original constituents of fresh yeast and about 50% to 60% protein (nitrogen X 6.25) on a dry basis.

The principal object of this invention is to provide a method of recovering an edible product from brewery residues such as spent brewers' grain and spent brewers' yeast and from fresh yeast.

Another object of the present invention is to produce an edible enzymatic protein hydrolysate satisfactory for human consumption and for consumption by animals other than ruminants. Said enzymatic protein hydrolysate may, of course, also be used by ruminants.

It has been found that the by-products obtained from the spent brewers' grain and yeast by the process of the instant invention contain a high percentage of protein. The products so obtained are edible and highly nutritious, and are ideal for use in baby foods, cereal fortification, amino acid isolation, and as a protein supplement in the fermentation nutrient in many microbiological processes, such as antibiotic production. These by-products might be upgraded with flavoring agents to compete with other hydrolyzed protein formulations for use in soups, sauces, gravies, spreads, meat tenderizer bases, etc. The by-products are a potential source of free amino acids. This application would, of course, involve fractionation of the free amino acids. The by-products obtained from spent brewers' yeast or fresh yeast, for example, might be used to impart yeast flavor to "instant" bread which is lacking in this particular flavor characteristic. The residue remaining after the edible product has been removed still contains a substantial amount of nutrients thus enabling one to use the residue as an animal feed, particularly for ruminants.

It is to be noted that the highly proteinaceous and edible by-product obtained from spent brewers' grain and spent brewers' yeast by the process of this invention as set forth hereinafter may also be obtained from fresh yeast preparations, such as fresh brewers' yeast and other types of food yeast. The term yeast, as used herein is meant to denote spent brewers' yeast, fresh brewers' yeast and other types of food yeast.

The invention accordingly comprises the process of subjecting spent brewers' grain and yeast to enzymatic hydrolysis, to the conversion of said spent brewers' grain and yeast to an edible product and to the recovery of said edible product.

Wet spent brewers' grain generally has a solids content of about 20%. This means that for every five tons of wet grain dried, approximately one ton of dried spent brewers' grain is obtained. In the instant invention, the process may be carried out starting with dried or wet spent brewers' grain. It is preferred, however, to start with the wet spent grain for reasons which will become obvious, and because higher yields are obtainable with wet spent brewers' grain.

To the spent brewers' grain may be added the spent yeast which has a solids content of about 15%–20%. The mixture, adjusted optimumly to a pH of about 6.5 to 8.5 and preferably to a pH of about 7.5 by the addition of alkali such as sodium hydroxide, is diluted with enough water for enzyme reaction to occur and to facilitate pumping the slurry. At least enough water should be added to make the mixture free-flowing enough to pump, but generally not more than the weight of the wet spent brewers' grain used. In the instance wherein wet spent brewers' yeast alone is used, it may not be necessary to add any water. An amount of water equal to the weight of wet spent grain has been found to be satisfactory. The slurry is thereafter sterilized by heating to 100° C. and holding at that temperature for at least one hour. The mixture is then allowed to cool to about 50° C. If the spent brewers' yeast heertofore had not been added, it may be added at this point. The enzyme formulations, made up as a 1% by weight suspension of enzyme in water, and having been previously treated with 0.5% by volume of chloroform and agitated for about one-half hour to destroy the microorganisms, is added to the spent grain mixture in concentrations of at least about 0.05% by weight based on the wet weight of the spent grain and/or yeast. Concentrations of at least about 0.1% are preferred when spent grain alone is used. The resultant mixture is agitated for about 24 hours at 50° C. An optimum period of agitation is from about 24 hours to about 48 hours. It is to be noted that when spent brewers' grain alone or in admixture with spent brewers' yeast or fresh yeast is used, a preferred time is about 48 hours. When spent brewers' yeast or fresh yeast alone is used, the preferred time is about 24 hours and no initial adjustment of pH is generally required. However, a satisfactory pH range is from about 5.0 to about 6.0. The mixture is thereafter subjected to centrifugation to remove the solids content. The residue is pressed to recover as much extract as possible. Other methods, such as filtration, for example, well known to those skilled in the art may be used to separate the solids content from the extract. The residue thus obtained contains a small amount of nitrogen and may be dried and combined with residues of dried brewers' spent grain and sold as an animal feed. The extracts obtained from the centrifugation step are concentrated to high solids and then vacuum drum-dried or spray-dried to yield the edible enzymatic protein hydrolysate containing from about 65 to 80% protein. The extracts may also be concentrated to a liquid with any desired solids content.

In the instance wherein spent brewers' yeast or fresh yeast is used as the starting material, it is to be noted that the sterilization step may be omitted. This is due presumably to the shorter reaction time required and the absence of thermophilic sporeformers. When spent brewers' grain is used as the starting material, a longer reaction time is necessary to obtain satisfactory yields, and because of the presence of thermophilic microorganisms, identified as sporeformers, sterilization is necessary to prevent spoilage of the mash.

In the process of the instant invention, enzymes which are valuable include pancreatin (4NF)[1], microbial proteases such as papain (P6)[2], ficin concentrate and bromelain, bacterial amylase such as is obtained from *Bacillus subtilis*, for example, and mixtures of these. Particularly valuable are pancreatin (4NF), ficin and papain (P6). Typical formulation may include, for example:

(1) 100% pancreatin (4NF)
(2) 100% papain (P6)
(3) 100% ficin concentrate
(4) 100% bromelain
(5) 95% pancreatin (4NF) +5% bacterial amylase
(6) 95% papain (P6) +5% bacterial amylase
(7) 95% ficin concentrate +5% bacterial amylase
(8) 95% bromelain +5% bacterial amylase
(9) Combinations of microbial proteases and bacterial amylase
(10) Combinations of pancreatin, papin, ficin concentrate and bromelain It is to be understood that combinations of enzymes other than those set forth hereinbefore are intended to the present invention. An optimum quantity of enzyme used is from about 0.05 to about 0.4% by weight based on the weight of wet spent brewery material used. A preferred amount is from about 0.1 to about 0.2% by weight. An optimum temperature for the enzymatic reaction is from about 35° to about 60° C. A preferred temperature is about 50° C. Temperatures below about 35° C. do not give a satisfactory yield, while temperatures above about 60° C. do not improve the yield significantly and may tend to cause excessive bitterness and off-flavor in the finished by-product. The effect of temperature on yield can be seen in Table 1.

TABLE 1

*Effect of temperature on yield*

| Percent Enzyme Formulation [1] | Reaction Time (hrs.) | Temperature (° C.) | Nitrogen Recovery (percent) | Solids Recovery (percent) |
| --- | --- | --- | --- | --- |
| 0.1 | 48 | 25 | 18.7 | 6.6 |
| 0.1 | 48 | 37 | 38.3 | 20.2 |
| 0.1 | 48 | 50 | 55.5 | 26.8 |

[1] 95% pancreatin (4NF) +5% bacterial amylase.

A typical analysis of dried spent brewers' grain is as follows:

Average percent
Protein _____ 27.7
Ash _____ 3.7
Moisture _____ 10.4
Crude fiber _____ 15.3
Fat _____ 6.9
Nitrogen-free extract _____ 35.9
Carbohydrate _____ 51.2

A typical analysis of a high proteinaceous product of the instant invention is as follows:

Percent
Protein _____ 73.8.
Ash _____ 14.7.
Moisture _____ 12.5.
Crude fiber _____ Negligible.
Fat _____ Negligible.
Carbohydrate _____ 5.0 (as glucose).

Methods are known in the art of upgrading brewers' grains and distillery slops. These methods are generally concerned with the addition of supplements, such as peptone, phosphates and fats, to spent brewers' grains or distillery slops. The resultant products are utilized as food for animals. Methods are also disclosed in the art of obtaining high protein content products from brewers' grain. These methods have certain disadvantages. They involve a physical separation of the proteinaceous material from the chaff generally involving the use of specialized equipment. Also, such methods do not yield a product of as high protein content as the product of the instant invention.

The proteinaceous product of this invention exhibits excellent solubility in water and is hygroscopic in nature. The product varies in color from light and medium amber to light buff. It exhibits a flat crystalline structure when vacuum dried and is an amorphous powder when spray-dried. The product is substantially free of fat, starch and fiber content. The product obtained from spent brewers' grain has a typical pleasant cereal aroma and a slightly sweet and malty taste followed by a slightly bitter after taste which is typical of peptone-amino acid products. The product obtained from spent brewers' yeast exhibits a typical, pleasant flavor of active dry yeast without bitterness or only very slightly bitter.

The nutritional comparison of the products of this invention, as is and after hydrolysis with 6 N hydrochloric acid, with casein (100% protein) and with hydrolyzed soya flour as shown in Table 2. It is to be noted that the essential amino acid content of the products of this invention, after hydrolysis, compares favorably with that of soya flour after hydrolysis.

---

[1] Pancreatin (4NF) contains 2040 hemoglobin units per gram (modified Anson's hemoglobin method).
[2] Papain (P6) contains 6000 hemoglobin units per gram (modified Anson's hemoglobin method).

TABLE 2

*Nutritional comparison of grain and yeast by-products with hydrolyzed soya flour and casein (100% protein)*

| | mM./100 gms. Casein (100% protein) | mM./100 gms. Soya Flour hydrolyzed | mM./100 gms. Yeast | | mM./100 gms. Spent Grain | |
|---|---|---|---|---|---|---|
| | | | As Is | Hydrolyzed | As Is | Hydrolyzed |
| Threonine | 35.91 | 16.1 | 5.4 | 18.4 | 4.1 | 16.8 |
| Methionine+½ cystine | 23.85 | 11.6 | 4.4 | 11.0 | 6.0 | 19.5 |
| Valine | 63.08 | 21.9 | 13.4 | 31.7 | 10.5 | 34.1 |
| Tryptophane | 6.54 | 3.3 | 1.5 | | 1.6 | |
| Arginine | 23.36 | 20.3 | 19.5 | 27.1 | 13.0 | 19.5 |
| Lysine | 54.81 | 21.1 | 12.3 | 30.4 | 5.9 | 16.4 |
| Phenylalanine and Tyrosine | 64.71 | 23.3 | 19.3 | 26.4 | 25.5 | 36.1 |
| Isoleucine | 49.92 | 20.1 | 10.5 | 23.1 | 8.2 | 24.6 |
| Histidine | 19.47 | 7.5 | 2.8 | 9.0 | 1.8 | 14.5 |
| Leucine | 67.59 | 28.7 | 22.2 | 33.4 | 29.7 | 61.1 |
| Glycine | 26.46 | 27.2 | 7.3 | 43.6 | 2.0 | 32.4 | mM.=millimoles.

The following examples are furnished by way of illustration and are not to be construed as limitations of the invention. In each of the examples, unless otherwise noted, the enzyme formulation is a 1% by weight suspension of the enzyme in water, and the enzyme suspensions were treated with 0.5% by volume of chloroform by agitation for one-half hour prior to use.

EXAMPLE I

One ton of wet spent brewers' grain, containing about 20% solids content and about 27% protein based on solids content, and one ton of water are pumped into a jacketed tank equipped with an agitator. The liquid is adjusted to pH 7.5 by the addition of sodium hydroxide and is heated, with agitation, to 100° C. and held at this temperature for one hour. The liquid is then pumped through a heat exchanger to a reaction tank where it is allowed to cool at 50° C. After the contents of the reaction tank reach 50° C., 0.1% by weight of pancreatin (4NF), based on the weight of the wet spent brewers' grain, is added as a suspension to the contents of the reaction tank, and the whole is agitated for 48 hours at 50° C. The reaction mixture is then centrifuged to separate the solid residue from the extract. The solid residue is pressed to recover as much extract as possible. The extracts are combined. The solid residue, containing about 10% protein, is dried and is suitable as an animal feed. The combined extracts are concentrated to near-dryness by means of a multiple effect evaporator and are then vacuum drum-dried to yield 106 pounds (26.6% recovery of solids) of a product having a protein content of 69% (total nitrogen X 6.25).

EXAMPLE II

The procedure of Example I is followed using 0.15% by weight of pancreatin (4NF), to yield 112 pounds (27.9% recovery of solids) of a product having a protein content of 76% (total nitrogen X 6.25).

EXAMPLE III

The procedure of Example I is followed using 0.2% by weight of pancreatin (4NF) to yield 117 pounds (29.3% recovery of solids) of a product having a protein content of 80.6% (total nitrogen X 6.25).

EXAMPLE IV

One ton of a different lot of wet spent brewers' grain containing about 20% solids content and about 27% protein based on solids content, and one ton of water are pumped into a jacketed tank equipped with an agitator. The liquid is adjusted to pH 7.5 by the addition of sodium hydroxide and is heated, with agitation, to 100° C. and held at this temperature for one hour. The liquid is then pumped through a heat exchanger to a reaction tank where it is allowed to cool to 50° C. After the contents of the reaction tank reach 50° C., 0.4% by weight of papain (P6), based on the weight of the wet spent brewers' grain is added as a suspension to the contents of the reaction tank, and the whole is agitated for 48 hours at 50° C. The reaction mixture is then centrifuged to separate the solid residue from the extract. The solid residue is pressed to recover as much extract as possible. The extracts are combined. The solid residue, containing about 10% protein, is dried and is suitable as an animal feed. The combined extracts are concentrated to near-dryness by means of a multiple effect evaporator and are then spray-dried to yield 104.8 pounds (26.2% recovery of solids) of a product having a protein content of 70% (total nitrogen X 6.25).

EXAMPLE V

Five hundred gallons of wet spent brewers' grain containing about 20% solids content and about 27% protein based on solids content, 25 gallons of wet spent brewers' yeast containing about 15% solids content and 475 gallons of water are pumped into a jacketed tank equipped with an agitator. The liquid is adjusted to pH 7.5 by the addition of sodium hydroxide and is heated, with agitation, to 100° C. and held at this temperature for one hour. The liquid is then pumped through a heat exchanger to a reaction tank where it is allowed to cool to 50° C. After the contents of the reaction tank reach 50° C., 0.15% by weight of bromelain, based on the weight of the wet brewers' grain and wet brewers' yeast, is added as a suspension to the contents of the reaction tank, and the whole is agitated for 48 hours at 50° C. The reaction mixture is then centrifuged to separate the solid residue from the extract. The solid residue is pressed to recover as much extract as possible. The extracts are combined. The solid residue, containing about 10% protein, is dried and is suitable as an animal feed. The combined extracts are concentrated to near-dryness by means of a multiple effect evaporated and are then spray-dried to yield a product having a protein content of at least 67% (total nitrogen X 6.25).

EXAMPLE VI

The procedure of Example V is followed using 0.15% by weight of an enzyme mixture consisting of 95% pancreatin (4NF) and 5% bacterial amylase from *B. subtilis* to yield a product having a protein content of at least 65% (total nitrogen X 6.25).

EXAMPLE VII

The procedure of Example V is followed using 0.2% by weight of ficin to yield a product having a protein content of at least about 70% (total nitrogen X 6.25).

EXAMPLE VIII

Two hundred ten gallons of wet spent brewers' yeast containing about 19% solids content are pumped into a jacketed tank equipped with an agitator. The liquid is heated to 50° C., and 0.1% by weight of pancreatin (4NF), based on the weight of the wet spent brewers' yeast, is added as a suspension to the contents of the reaction tank, and the whole is agitated for 24 hours at 50° C. The reaction mixture is then centrifuged to separate the solid residue from the extract. The solid residue is pressed to recover as much extract as possible. The extracts are combined. The solid residue, containing a small amount of nitrogen is dried, combined with residues of dried brewers' spent grain, and is suitable as an animal feed. The combined extracts are concentrated to near-dryness by means of a multiple effect evaporator and are then vacuum drum-dried to yield a product having a protein content of 65.6% (total nitrogen X 6.25).

EXAMPLE IX

Following the procedure of Example VIII, two thousand grams of wet fresh brewers' yeast containing about 20% solids content are reacted with 0.1% by weight of an enzyme mixture of 95% pancreatin (4NF) and 5% bacherial amylase from *B. subtilis* to yield a product having a protein content of at least 65% (total nitrogen X 6.25).

What is claimed is:

1. A method of producing a high proteinaceous edible product which comprises the steps of adding to a brewery material selected from the group consisting of spent brewer's grain, spent brewers' yeast, fresh food yeast and mixtures thereof sufficient water for enzymatic reaction to occur, sterilizing the mixture, thereafter contacting said mixture with an enzyme selected from the group consisting of pancreatin, papain, ficin, bromelain, bacterial amylase and mixtures thereof; maintaining said contact with agitation at a temperature of about 35° to about 60° C. for a period of from about 24 to about 48 hours, separating the solid residue from the liquid extracts and thereafter concentrating the extracts.

2. A method of producing a high proteinaceous edible product which comprises the steps of adding to a brewery material selected from the group consisting of spent brewers' grain, spent brewers' yeast, fresh food yeast and mixtures thereof sufficient water for enzymatic reaction to occur, sterilizing the mixture, thereafter contacting said mixture with from about 0.05 to about 0.4% by weight of wet brewery material of an enzyme selected from the group consisting of pancreatin, papain, ficin, bromelain, bacterial amylase and mixtures thereof, maintaining said contact with agitation at a temperature of about 35° to 60° C. for a period of from about 24 to about 48 hours; thereafter separating the solid residue from the liquid extracts and concentrating the extracts.

3. A method of producing a high proteinaceous edible product which comprises the steps of adjusting spent brewers' grain to a pH of from about 6.5 to about 8.5, adding sufficient water for enzymatic reaction to occur, sterilizing the mixture, thereafter contacting said mixture with from about 0.1 to about 0.4% by weight of wet spent brewers' grain of an enzyme selected from the group consisting of pancreatin, papain, ficin, bromelain, bacterial amylase and mixtures thereof, maintaining said contact with agitation at a temperature of about 50° C. for a period of from about 24 hours to about 48 hours; thereafter separating the solid residue from the liquid extracts and concentrating the extracts by removal of the major portion of the contained water.

4. The method of claim 3 wherein the enzyme is pancreatin.

5. The method of claim 3 wherein the enzyme is papain.

6. The method of claim 3 wherein the enzyme is ficin.

7. The method as set forth in claim 1 wherein the high proteinaceous edible product is recovered as a solid by concentrating the extracts to dryness.

References Cited by the Examiner

UNITED STATES PATENTS

| | | | |
|---|---|---|---|
| 1,962,831 | 6/34 | Moskovits | 195—82 |
| 1,991,242 | 2/35 | Cole et al. | 99—5 |
| 2,217,264 | 10/40 | Weizmann | 99—14 |
| 2,419,960 | 5/47 | Legg | 195—37 |
| 2,636,823 | 4/53 | Berze | 99—5 |
| 2,754,211 | 7/56 | Siefker et al. | 99—14 |
| 2,965,489 | 12/60 | Clickner | 99—5 |

A. LOUIS MONACELL, *Primary Examiner.*

UNITED STATES PATENT OFFICE
CERTIFICATE OF CORRECTION

Patent No. 3,212,902

October 19, 1965

Vincent S. Bavisotto

It is hereby certified that error appears in the above numbered patent requiring correction and that the said Letters Patent should read as corrected below.

Column 4, TABLE 1, last column, line 3 thereof, for "26.8" read -- 26.6 --; line 72, for "as" read -- is --; column 5, TABLE 2, second column, line 10 thereof, for "67.59" read -- 76.59 --.

Signed and sealed this 28th day of June 1966.

(SEAL)
Attest:

ERNEST W. SWIDER
Attesting Officer

EDWARD J. BRENNER
Commissioner of Patents